United States Patent [19]

Eggers et al.

[11] Patent Number: 4,675,133
[45] Date of Patent: Jun. 23, 1987

[54] PROCESS FOR APPARATUS FOR THE RECOVERY OF FATS AND OILS

[75] Inventors: Rudolf Eggers, Buxtehude; Ernst-Gunter Schade, Hamburg, both of Fed. Rep. of Germany

[73] Assignee: Fried. Krupp Gesellschaft mit beschränkter Haftung, Essen, Fed. Rep. of Germany

[21] Appl. No.: 623,434

[22] Filed: Jun. 22, 1984

[30] Foreign Application Priority Data

Jun. 25, 1983 [DE] Fed. Rep. of Germany ....... 3322968

[51] Int. Cl.$^4$ ............................ C09F 5/02; C11B 1/06
[52] U.S. Cl. .............................. 260/412.2; 260/412.4
[58] Field of Search ........................... 260/412.2, 412.4

[56] References Cited

U.S. PATENT DOCUMENTS 4,357,865 11/1982 Knuth et al. ........................ 100/37
4,466,923 8/1984 Friedrich ......................... 260/412.4

FOREIGN PATENT DOCUMENTS 2091292 1/1981 United Kingdom ............. 260/412.4

*Primary Examiner*—Charles F. Warren
*Assistant Examiner*—Elizabeth A. Flaherty
*Attorney, Agent, or Firm*—Spencer & Frank

[57] ABSTRACT

A process is disclosed for recovering fats and oils from oil fruits and oil seeds, wherein the oil fruits and oil seeds are cleaned, immediately thereafter pressed cold in a screw press without prior mechanical conditioning, and then extracted. In this process, the extraction is effected immediately after pressing by treating the oil fruits and oil seeds with countercurrently flowing carbon dioxide, ethane, ethene and/or propane at a temperature of from 40° to 110° C. and at a pressure of from 250 to 750 bar, for a time period of from 0.5 to 2.5 hours, with the solvent ratio lying between 5 and 30 kg solvent per 1 kg pressed cake. The separation of the extracted fats and oils from the separated solvent phase is effected by pressure reduction and/or temperature change. The invention also includes an apparatus for implementing the process.

5 Claims, 3 Drawing Figures

PROCESS FOR APPARATUS FOR THE RECOVERY OF FATS AND OILS

The present invention relates to a method for the recovery of vegetable oils from oil fruits and oil seeds, wherein oil fruits and oil seeds having a maximum particle diameter of 10 mm are cleaned, immediately prepressed cold without mechanical conditioning in a screw press, and then extracted. The present invention further relates to an apparatus for implementing the process.

BACKGROUND OF THE INVENTION

German Pat. No. 2,915,538 (corresponding to U.S. Pat. No. 4,357,865) discloses a process for recovering oil from oil fruits and oil seeds by cleaning, cold pressing and extraction; wherein the oil fruits or oil seeds are prepressed cold immediately after cleaning without mechanical and thermal conditioning, and the remaining solids are then extracted. The process is performed in a strainer screw press which includes a rotating screw, a perforated curb around the screw, a strainer constructed of rods, and at least one choke; wherein the curb tapers to become narrower toward the discharge end and each one of the inserted chokes forms a shear gap between itself and the curb, with the relationship between each gap and the respective curb being between 1:3 and 1:15.

The oil fruits and oil seeds which have been prepressed in the strainer screw press are then extracted with a liquid solvent, preferably hexane. It is necessary to remove the solvent from the extracted material in a further process stage, which requires a large amount of energy since the solvent used for the extraction must be separated quantitatively from the extract in the solvent separation stage.

SUMMARY OF THE INVENTION

It is the object of the present invention to improve the above-mentioned vegetable oil recovery process such that the complicated step of removing the solvent from the extract can be omitted and a continuous process operation is possible. It is a further object of the invention to provide apparatus for implementing the present process which will operate reliably and continuously.

These objects are achieved by cold pressing the oil fruits and oil seeds in a screw press and then immediately extracting the pressed cake with a solvent gas under supercritical conditions in a continuous process using an apparatus whereby the pressed cake leaving the screw press and entering the high pressure extractor maintains a constant seal on the extractor, thereby permitting continuous operation.

The present invention will now be described in greater detail with the aid of an embodiment that is illustrated in the drawings.

DESCRIPTION OF THE PREFERRED EMBODIMENTS

Figure 1:
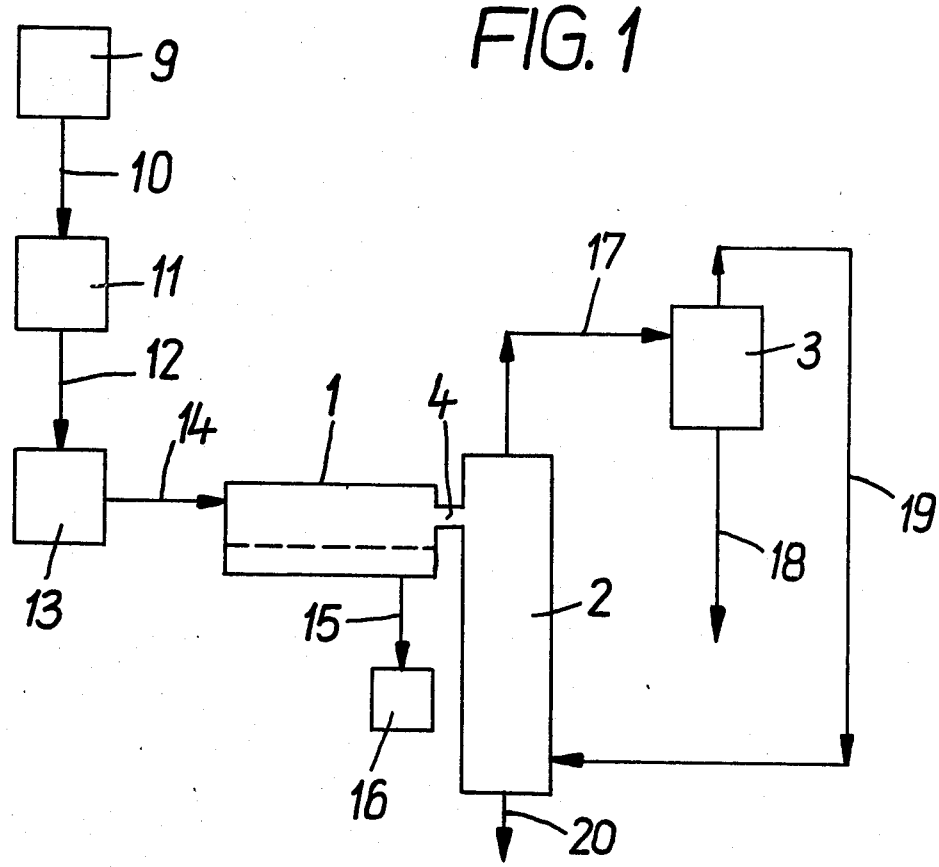
FIG. 1 is a flow chart for the process according to the present invention.

The present invention solves the problem of maintaining a continuous extraction process step by conducting the extraction immediately after prepressing, as well as dispensing with conventional solvent removal processes following extraction. The extraction is accomplished by treating the oil fruit and oil seed press cake with carbon dioxide, ethene, ethane and/or propane, flowing countercurrently to the pressed cakes, at a temperature of from 40° to 110° C., a pressure of from 250 to 750 bar, for a time period of from 0.5 to 2.5 hours, with the solvent ratio lying between 5 and 30 kg per kg of pressed cake. The extracted fats and oils are separated from the solvent phase by pressure reduction and/or a change in temperature. The proposal of separating the extracted fats and oils from the solvent phase by pressure reduction and/or temperature change means that the separation can be effected either by reducing the pressure, or by reducing the temperature, or by raising the temperature, or by reducing the pressure and reducing the temperature, or by reducing the pressure and raising the temperature.

DE-OS No. 2,127,596 discloses a process for obtaining vegetable fats and vegetable oils wherein the fats or oils are extracted from the raw vegetable materials with supercritical gases. DE-OS No. 2,843,920 discloses a process for separating fats and oils wherein glycerides, free fatty acids, aldehydes, ketones, aromatics and flavoring agents are absorbed together by a supercritical gas phase from raw vegetable fats and oils, then refined and fractionated. However, it was nevertheless surprising to the person of average skill in the art that the process according to German Pat. No. 2,915,538 using a strainer screw press could be improved by the use of the known process of extracting fats and oils with supercritical gases. It could not have been predicted that the pressed cake obtained by pressing the oil fruits and oil seeds could be conveyed directly from the screw press into the extraction system and would there be extracted without further pretreatment. In the classical method the seed is cleaned, sieved, broken in rolling mills, heated to about 90° C. and then prepressed.

Applicants' invention rests on their discovery of an apparatus that produces a pressure stable, gas tight pressed cake plug which forms at the end of the screw press in the pressing process, which plug is continuously renewed by the pressing process and conveyed into the extraction system.

The pressed cake is advantageously introduced into the extraction apparatus continuously. This continuous operation had previously been impossible in practice because no operationally reliable apparatus was available for continuously feeding the extraction system with solids. The continuous introduction of the pressed cake into the extraction system as provided by the present invention thus permits operationally reliable, continuous operation of the entire process so that, for example, 200 metric tons of oil, fruits and seeds can be processed per day. The throughput capacity results from the known value of a press for mechanical pretreatment (~200 t/d).

It is further provided according to the present invention that the pressure reduction and/or change in temperature with which separation of the extracted fats and oils from the separated solvent phase is accomplished in a plurality of stages, making it possible to obtain individual fat and oil fractions which have different compositions.

In a preferred embodiment of the invention it is provided that the extraction is effected by treating the prepressed oil fruits and oil seeds with carbon dioxide at a temperature of from 45° to 90° C. and at a pressure of from 280 to 750 bar for a time period of from one to two hours, with the solvent ratio lying between 15 and 25 kg carbon dioxide per kg of pressed cake, and the separation of the extracted fats and oils is effected by reducing the pressure to 75 to 100 bar. In this manner of conducting the process, the extraction evidences particularly good yields of fats and oils.

In addition to the extraction in the first paragraph of the Description of the Preferred Embodiments, the following gases may come into consideration as solvents:

nitrous oxide ($N_2O$)
trifluoromethane
nitrogen
argon.

Pressures, temperatures, and residence times are likewise indicated in the first paragraph of the Description of the Preferred Embodiments. According to the latest investigations, the lower limits for pressure and temperature should be fixed at 150 bars and 20° C., respectively.

In the described process all oil bearing seeds can be processed; however, oil fruits such as coconuts are first to be broken up to a particle diameter of smaller than 10 millimeters.

The present invention also provides an apparatus for carrying out the new continuous extraction process. This apparatus includes a strainer screw press, a high pressure extractor immediately following the press, and an apparatus for separating the extracted fats and oils. The pressed cake discharge aperture in the strainer screw press is disposed at the upper portion of the high pressure extractor. The apparatus designed according to the present invention makes it possible, in an advantageous manner, to continuously recover fats and oils from oil fruits and oil seeds by prepressing and extraction, resulting in high yields.

The apparatus according to the present invention is operationally reliable and is rarely subject to malfunction.

Uniform extraction and short extraction times are realized by having a slowly revolving stirring mechanism driven by the shaft of the strainer screw press disposed in the high pressure extractor. The use of complicated high pressure seals in passages through the wall of the extractor for a stirring mechanism is avoided. The uniform introduction of the pressed cake from the strainer screw press and the uniform discharge of the extracted solids are both improved by the present invention as an input screw mounted within the high pressure extractor is connected to the shaft of the strainer screw press, and a discharge screw is disposed in the lower portion of the high pressure extractor. According to the present invention, the discharge screw may advantageously be a screw press having a closed strainer case.

According to the process shown in FIG. 1, the oil fruits and oil seeds are transported from reservoir bunker 9 through conduit 10 into the cleaning system which comprises an air classifier 11 and a sifting machine 13 which are connected together by means of conduit 12. In the cleaning system, the oil fruits and oil seeds are free from dust, dirt particles and remaining plant portions. The cleaned oil fruits and oil seeds then travel through conduit 14 into the strainer screw press 1, which is disclosed in German Pat. No. 2,915,538, and in which the oil fruits and oil seeds are prepressed cold without prior mechanical conditioning. The oil obtained thereby is conveyed into reservoir tank 16 through conduit 15. A pressure is built up in strainer screw press 1 equal to the pressure used in the subsequent extraction process. At the end of the strainer screw press 1, the pressed material passes through pressed cake discharge aperture 4 and immediately enters high pressure extractor 2, since the pressed cake discharge aperture 4 opens directly into the upper portion of high pressure extractor 2.

In high pressure extractor 2, the pressed cake is extracted with countercurrently flowing carbon dioxide, ethene, ethane and/or propane. The extracted pressed cake discharges from high pressure extractor 2 through conduit 20, while the solvent phase containing the extracted fats and oils travels through conduit 17 into the apparatus for separating the extracted fats and oils 3. There, the charged solvent phase is separated into its components by pressure reduction and/or temperature changes. The separated fats and oils are discharged through conduit 18 while the solvent, now free of fats and oils, returns through conduit 19 to high pressure extractor 2.

Figure 2:
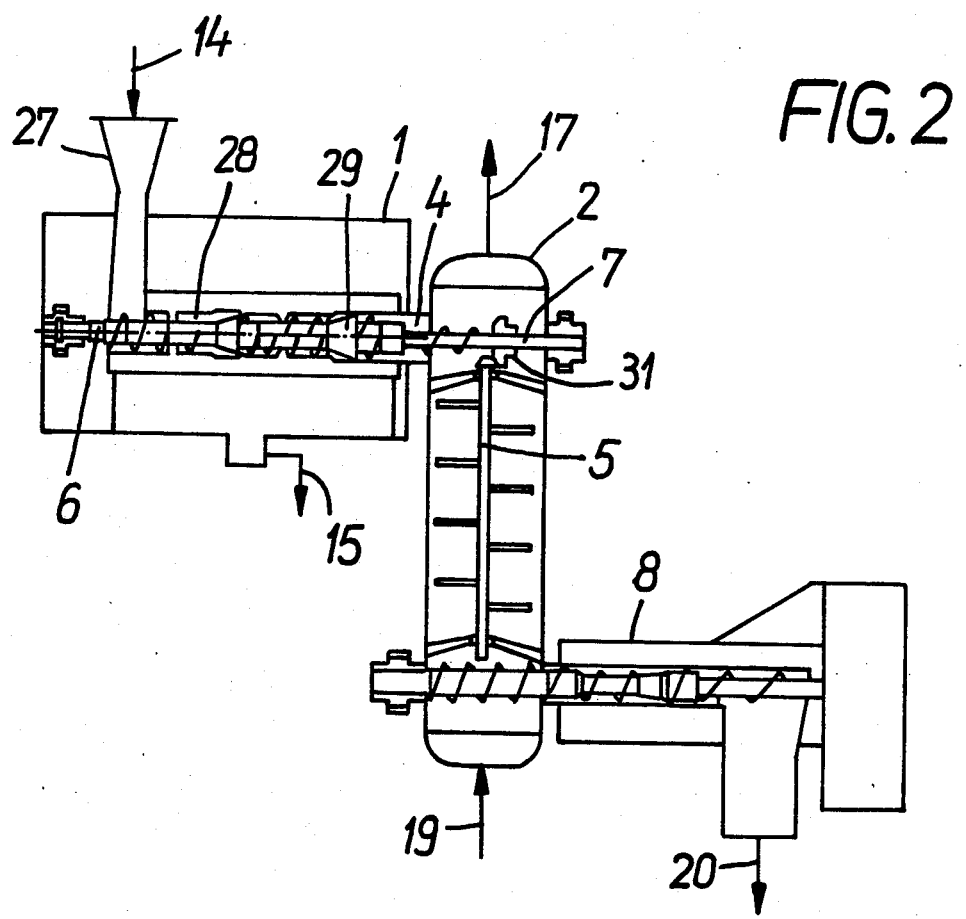
FIG. 2 shows a strainer screw press attached directly to a high pressure extractor.

FIG. 2 shows the strainer screw press 1, which is part of the apparatus according to the present invention, and the immediately following high pressure extractor 2. Through conduit 14, the cleaned oil seeds and oil fruits travel into feed funnel 27 of the strainer screw press 1 and are prepressed therein. The pressed-out oil flows from the strainer screw press through conduit 15. In screw channel 28, a pressed cake is built up by screw 29 during the pressing process which is continuously transported through pressed cake discharge aperture 4 into high pressure extractor 2. A feed screw 7 is mounted on shaft 6 of strainer screw press 1, which extends through the pressed cake discharge aperture 4, and is rotably mounted in the upper portion of high pressure extractor 2. Feed screw 7 conveys the pressed cake uniformly and continuously into high pressure extractor 2, which is equipped with a slowly revolving stirring mechanism 5, which enhances the exchange of fats and oils during the extraction process by increasing contact between the pressed cake and the counter-currently flowing solvent. The stirring mechanism supports the transport of material in the extractor and prevents clogging. Stirring mechanism 5 is driven by gear 31 on shaft 6 of screw press 1. Coupling of strainer screw press 1 with high pressure extractor 2 is made possible by the increase of pressure in the press and by the development of a gas-tight plug at the end of the press.

The solvent is conducted through conduit 19 into high pressure extractor 2 which is equipped with internal or external heating devices (not shown) to maintain the required extraction temperature and to avoid freezing, should there be an emergency shutdown of the system. When setting the extraction temperature it must be considered that in most cases the pressed cake has a temperature of between 75° and 90° C., thus the entrance temperature of the solvent must be about 40° C. if an extraction temperature of about 50° C. is to be maintained. The solvent phase charged with the fats and oils leaves high pressure extractor 2 through conduit 17.

In the lower portion of high pressure extractor 2, a discharge screw 8 is provided whose shaft is designed as a packing screw and is rotably mounted in the wall of high pressure extractor 2. Discharge screw 8 likewise seals the extraction chamber in a pressure tight manner. A screw press having a closed strainer cage can be used to advantage as the discharge screw 8. The extracted material is removed through conduit 20 while being freed of the still adhering solvent by degassing in air or in a special storage vessel. The degassing vessel is not shown in the drawing.

Figure 3:
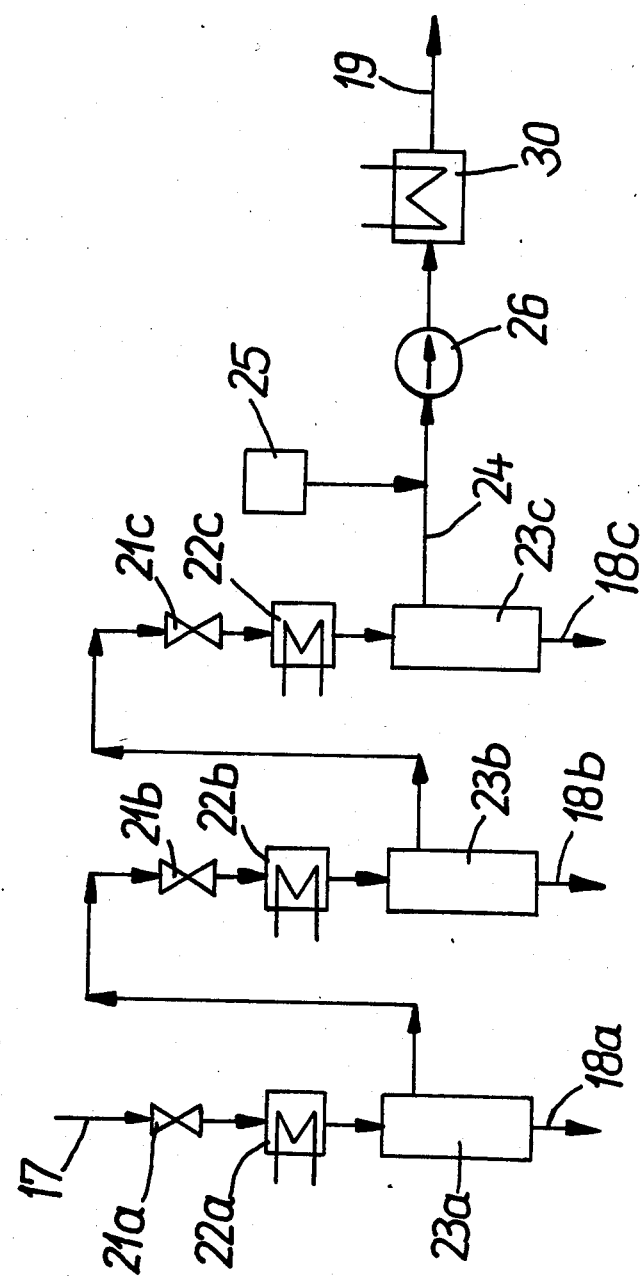
FIG. 3 shows the apparatus for separating the extracted fats and oils from the solvent in a block flow diagram.

Conduit 17 conducts the charged solvent phase into the apparatus for separating the extracted fats and oils 3, as shown in FIG. 1. This apparatus may be a single stage or may be designed as a multistage unit, as shown in FIG. 3. In the apparatus according to FIG. 3, the charged solvent phase is initially set in expansion valve 21a and heat exchanger 22a to the separation pressure and the separation temperature. In separator 23a, fats and oils are then separated according to their thermodynamic equilibrium to form a first fraction which is discharged through conduit 18a. In the two subsequent stages, two further fractions are separated by changing the separation conditions. In many cases it has been found particularly useful to separate the extracted fats and oils in several fractions. The solvent freed of the extracted fats and oils trvels through conduit 24 into compressor 26 and from there into heat exchanger 30 before it is returned to the extraction circuit through conduit 19. In compressor 26 and in heat exchanger 30 the extraction pressure and extraction temperature of the solvent are set. Solvent losses are replenished from reservoir vessel 25.

EXAMPLE 1

With the process according to the present invention, sunflower seeds having a fat content of about 40 weight percent were processed at the rate of 150 metric tons per day. In strainer screw press 1, the fat content of the starting material was reduced to 20 weight percent. The extraction stage was operated at about 400 bar and about 50° C., with carbon dioxide used as the solvent. The solvent ratio was at 20 kg carbon dioxide per 1 kg pressed cake. The residence time of the pressed material in the high pressure extractor was from 1 to 2 hours. High pressure extractor 2 had a diameter of 1.5 m and a height of 10 m. The extracted pressed cake left high pressure extractor 2 with a fat content of less than 1 weight percent. The extracted sunflower oil separated from the solvent phase was of good quality and had a relatively low phosphate content (<5 ppm). In many cases, with such low phosphate contents, desliming of the oil was not necessary.

Additional example (example 2):
  Processing of rapeseed:
    Throughput: 1,000 t/d. According to the present application, 5 plants, switched in parallel, are necessary.
    Residence time: 1 to 2 hrs.
    Initial oil content: 40%.
    Oil content before extraction: <20% by wt.
    Oil content after extraction: 1.8% by wt. No solvent residuals in the meal. Phosphatides content very low (less than 5 ppm).
  Comparative values in conventional extraction:
    Prepressing plant with 5 presses, 1 extraction plant
    Throughput: 1,000 t/d.
    Residence time: 90 min.
    Initial oil content: 40% by wt.
    Oil content before extraction: 20% by wt.
    Oil content after extraction: 1.8% by wt.
    Residual hexane content in the meal: 500–800 ppm.

The following table lists the critical data for the solvents used for the process according to the present invention.

| Solvent | $p_c$ (bar) | $T_c$ (°C.) |
|---------|-------------|-------------|
| $CO_2$  | 73.9        | 31.1        |
| $C_2H_4$ | 50.7       | 9.5         |
| $C_2H_6$ | 49.1       | 32.2        |
| $C_3H_8$ | 42.6       | 96.7        |

The above described embodiments and examples are provided for the purpose of illustrating this invention. The invention is contemplated, however, to include all modifications and equivalent embodiments within the scope of the claims set forth below.

We claim:

1. A continuous process for the recovery of fats and oils from oil fruits and oil seeds, wherein oil fruits and oil seeds having a maximum particle diameter of 10 mm are cleaned, are immediately thereafter pressed cold in a screw press without mechanical conditioning to form a pressed cake that is then extracted; comprising the improvement of pressing cleaned oil fruit and oil seed particles in a screw press that discharges directly into an extraction apparatus, said screw press forming a pressure-stable, gas-tight pressed cake plug that is continuously renewed during pressing, continuously extracting the pressed cake immediately after pressing in said extraction apparatus with a supercritical gas solvent selected from the group consisting of carbon dioxide, ethene, ethane, propane, nitrous oxide, trifluoromethane, nitrogen, argon and a combination of two or more thereof, in countercurrent flow at a temperature of from 20° to 110° C. and at a pressure of from 150 to 750 bar for a time period of from 0.5 to 2.5 hours, with the solvent ratio lying between 5 and 30 kg solvent per 1 kg pressed cake, and separating the extracted fats and oils from the solvent by reducing the pressure and/or changing the temperature.

2. The process as recited in claim 1, wherein the step of separating the extracted fats and oils from the solvent is effected in a plurality of stages.

3. The process as recited in claim 1, wherein the pressed cake is extracted with carbon dioxide at a temperature of from 45° to 90° C. at a pressure of from 280 to 750 bar for a time period of from 1 to 2 hours, with the solvent ratio lying between 15 and 25 kg carbon dioxide per 1 kg pressed cake and the step of separating the extracted fats and oils is effected by reducing the pressure to within the range of from 75 to 100 bar.

4. The process as recited in claim 1, wherein the solvent is at a temperature between 40° C. and 110° C. and at a pressure between 250 and 750 bar.

5. The process as recited in claim 1, wherein the solvent is selected from the group consisting of carbon dioxide, ethene, ethane, and a combination of two or more thereof.

* * * * *

UNITED STATES PATENT AND TRADEMARK OFFICE
CERTIFICATE OF CORRECTION

PATENT NO. : 4,675,133

DATED : June 23rd, 1987

INVENTOR(S) : Rudolf EGGERS and Ernst-Gunter SCHADE

It is certified that error appears in the above-identified patent and that said Letters Patent is hereby corrected as shown below:

Kindly change the title of the patent from "PROCESS FOR APPARATUS FOR THE RECOVERY OF FATS AND OILS" to —PROCESS AND APPARATUS FOR THE RECOVERY OF FATS AND OILS—.

Signed and Sealed this

First Day of December, 1987

*Attest:*

DONALD J. QUIGG

*Attesting Officer*  *Commissioner of Patents and Trademarks*